(12) United States Patent
Saad et al.

(10) Patent No.: US 9,760,094 B2
(45) Date of Patent: Sep. 12, 2017

(54) DISTRIBUTED COLLABORATIVE OPERATIONS PROCESSOR SYSTEMS AND METHODS

(71) Applicant: The Boeing Company, Chicago, IL (US)

(72) Inventors: Emad W. Saad, Renton, WA (US); John L. Vian, Renton, WA (US)

(73) Assignee: The Boeing Company, Chicago, IL (US)

( * ) Notice: Subject to any disclaimer, the term of this patent is extended or adjusted under 35 U.S.C. 154(b) by 485 days.

(21) Appl. No.: 14/509,948

(22) Filed: Oct. 8, 2014

(65) Prior Publication Data

US 2016/0155339 A1 Jun. 2, 2016

(51) Int. Cl.
| | |
|---|---|
| G05D 1/10 | (2006.01) |
| G05D 1/02 | (2006.01) |
| G08G 5/00 | (2006.01) |
| G08G 5/04 | (2006.01) |
| H04L 29/08 | (2006.01) |
| H04L 29/06 | (2006.01) |

(52) U.S. Cl.
CPC ........... *G05D 1/104* (2013.01); *G05D 1/0287* (2013.01); *G05D 1/0295* (2013.01); *G08G 5/0034* (2013.01); *G08G 5/0039* (2013.01); *G08G 5/0069* (2013.01); *G08G 5/0078* (2013.01); *G08G 5/0082* (2013.01); *G08G 5/045* (2013.01); *H04L 67/12* (2013.01); *H04L 67/125* (2013.01); *H04L 69/18* (2013.01); *H04L 69/08* (2013.01)

(58) Field of Classification Search
CPC .. G08G 5/0034; G08G 5/0039; G08G 5/0069; G08G 5/045; G05D 1/0088; G05D 1/0287; G05D 1/0291; G05D 1/0293; G05D 1/0295; G05D 1/104
See application file for complete search history.

(56) References Cited

U.S. PATENT DOCUMENTS

| | | | | |
|---|---|---|---|---|
| 7,415,331 | B2* | 8/2008 | Dapp | G05D 1/0088 701/25 |
| 7,451,023 | B2* | 11/2008 | Appleby | G05D 1/0088 701/24 |
| 8,463,464 | B2* | 6/2013 | Gustafsson | G05D 1/104 701/120 |
| 8,886,459 | B2* | 11/2014 | Stefani | G08G 5/0069 701/120 |
| 9,401,758 | B2* | 7/2016 | Bosworth | G08G 5/0069 |
| 2004/0030451 | A1* | 2/2004 | Solomon | G05D 1/0088 700/245 |

(Continued)

*Primary Examiner* — Dale W Hilgendorf
(74) *Attorney, Agent, or Firm* — Kunzler Law Group, PC

(57) ABSTRACT

Described herein is an apparatus for semi-autonomous vehicle control of a vehicle includes a distributed mission module configured to modify a mission element of a group mission based on availability of data. The group mission involves a plurality of vehicles. The apparatus also includes a guidance module configured to compute a path for a local vehicle of the plurality of vehicles based on the modified mission element. The path is configured to achieve the modified mission element. Additionally, the apparatus includes a multi-protocol translator module configured to convert the path into one or more control commands for the local vehicle. The distributed mission module, guidance module, and multi-protocol translator are located on-board the vehicle.

23 Claims, 6 Drawing Sheets

(56) References Cited

U.S. PATENT DOCUMENTS

| | | | | |
|---|---|---|---|---|
| 2004/0068351 | A1* | 4/2004 | Solomon | G05D 1/104 701/24 |
| 2006/0235584 | A1* | 10/2006 | Fregene | G05D 1/104 701/23 |
| 2009/0319096 | A1* | 12/2009 | Offer | G05D 1/0027 701/2 |
| 2014/0074339 | A1* | 3/2014 | Casado | G05D 1/0088 701/24 |

* cited by examiner

DISTRIBUTED COLLABORATIVE OPERATIONS PROCESSOR SYSTEMS AND METHODS

FIELD

This disclosure relates generally to unmanned vehicles, and more particularly to distributed collaborative operations for unmanned vehicles.

BACKGROUND

Unmanned vehicles, such as unmanned air vehicles (UAV) or unmanned ground vehicles (UGV), are controlled by central command stations. The unmanned vehicles are dependent on communication links between the unmanned vehicle and the central command station, and are limited to wireless line-of-sight (LOS) communications with the central command station. Dependency on the wireless communications link results in mission abort if the unmanned vehicles travel outside of communication range with the central command station.

SUMMARY

The subject matter of the present application has been developed in response to the present state of the art, and in particular, in response to shortcomings of conventional UAV or UGV command systems. The subject matter of the present application has been developed to provide a system and method that overcome at least some of the above-discussed shortcomings of prior art techniques.

According to one embodiment, an apparatus for semi-autonomous vehicle control of a vehicle includes a distributed mission module configured to modify a mission element of a group mission based on availability of data. The group mission involves a plurality of vehicles. The apparatus also includes a guidance module configured to compute a path for a local vehicle of the plurality of vehicles based on the modified mission element. The path is configured to achieve the modified mission element. Additionally, the apparatus includes a multi-protocol translator module configured to convert the path into one or more control commands for the local vehicle. The distributed mission module, guidance module, and multi-protocol translator are located on-board the vehicle.

In one implementation of the apparatus, the distributed mission module selects a contingency element corresponding to the mission element in response to data from a central control station being unavailable.

In yet one implementation of the apparatus, the distributed mission module defines at least one task for the local vehicle based on the modified mission element. The task includes a task type, a task location, and a task parameter. The guidance module computes a path based on the at least one task.

According to one implementation of the apparatus, the guidance module is further configured to compute paths for each of the others of the plurality of vehicles based on the modified mission element.

In one implementation, the apparatus also includes a health manager module configured to determine a health state of the local vehicle. The distributed mission module modifies the mission element based on the health state.

According to yet one implementation, the apparatus further includes a swarm control module configured to compute one or more control commands for the local vehicle to cooperate as a swarm with the plurality of vehicles.

According to one implementation, the apparatus further includes a deconfliction module configured to receive waypoint goals for the plurality of vehicles and to modify the path based on the waypoint goals to minimize path conflicts among the plurality of vehicles.

In one implementation, the apparatus further includes a collision avoidance module configured to receive vehicle positions for the plurality of vehicles and to modify the path in real-time based on the vehicles positions to avoid collisions.

In yet one implementation, the apparatus further includes a task manager module configured to define a task for the local vehicle based on the modified mission element. The guidance module is further configured to generate a waypoint goal based on the defined task. The apparatus may also include a health module configured to determine a health state of the local vehicle. The health state may include a fuel status of the local vehicle and the task management module modifies the task based on the health state.

According to one implementation, the apparatus further includes a task planning module configured to generate a waypoint goal based on the modified mission element. The guidance module is further configured to compute a flight path that reaches the waypoint goal.

In one implementation, the apparatus also includes a resource manager module configured to identify resources and capabilities of the plurality of vehicles. The distributed mission module modifies the mission element based on available resources and capabilities of the plurality of vehicles.

According to one implementation of the apparatus, the multi-protocol translator module automatically identifies a protocol of the path, and automatically converts the path into a different protocol corresponding with the one or more control commands for the local vehicle.

In another embodiment, a method for semi-autonomous vehicle control includes receiving a mission element of a group mission, where the group mission involves a plurality of vehicles. The method also includes modifying the mission element based on availability of data. Additionally, the method includes generating one or more control commands for a local vehicle of the plurality of vehicles based on the modified mission element.

According to one implementation, the method further includes receiving vehicle positions for the plurality of vehicles, receiving health data for the plurality of vehicles, and modifying the mission element based on the vehicles positions and the health data.

In one implementation, the method also includes generating at least one task based on the modified mission element. The task is configured to accomplish the modified mission element. The method further includes calculating a local waypoint goal based on the at least one task. Generating the one or more control commands includes calculating a flight path from a current position to the local waypoint goal. Additionally, the method includes communicating the local waypoint goal to others of the plurality of vehicles. The method can also include receiving waypoint goals from the others of the plurality of vehicles, calculating a path that minimizes path conflicts based on the received waypoint goals, and modifying the one or more control commands based on a calculated path.

According to one implementation, the method further includes defining a formation for the plurality of vehicles based on the modified mission element. Generating the one or more control commands includes calculating positional commands and velocity commands for the local vehicle consistent with the defined formation.

In yet another embodiment, a system for semi-autonomous vehicle control includes a central command station that provides a group mission. The group mission includes a plurality of mission elements. The system also includes a plurality of vehicles, where each vehicle includes an autonomy module. Each autonomy module includes a distributed mission module configured to modify one of the plurality of mission elements of the group mission based on availability of data. The group mission involves the plurality of vehicles. Each autonomy module also includes a guidance module configured to compute a path for a local vehicle of the plurality of vehicles based on the modified mission element. Additionally, each autonomy module includes a communications module configured to transmit and receive positions for the plurality of vehicles. The path is computed based on the positions for the plurality of vehicles.

According to one implementation of the system, the distributed mission module selects a contingency element corresponding to one of the plurality of mission elements in response to data from the central command station being unavailable.

In one implementation of the system, the plurality of vehicles includes one or more vehicles of the group consisting of: fixed-wing aircraft, rotary-wing aircraft, watercraft, and ground vehicles.

According to yet one implementation of the system, the autonomy modules of the plurality of vehicles are redundant.

In another implementation of the system, the communications module comprises a plurality of wireless link drivers each corresponding with a different wireless communication link.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter, they are not therefore to be considered to be limiting of its scope.

The subject matter will be described and explained with additional specificity and detail through the use of the drawings, in which.

DETAILED DESCRIPTION

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

Figure 1:
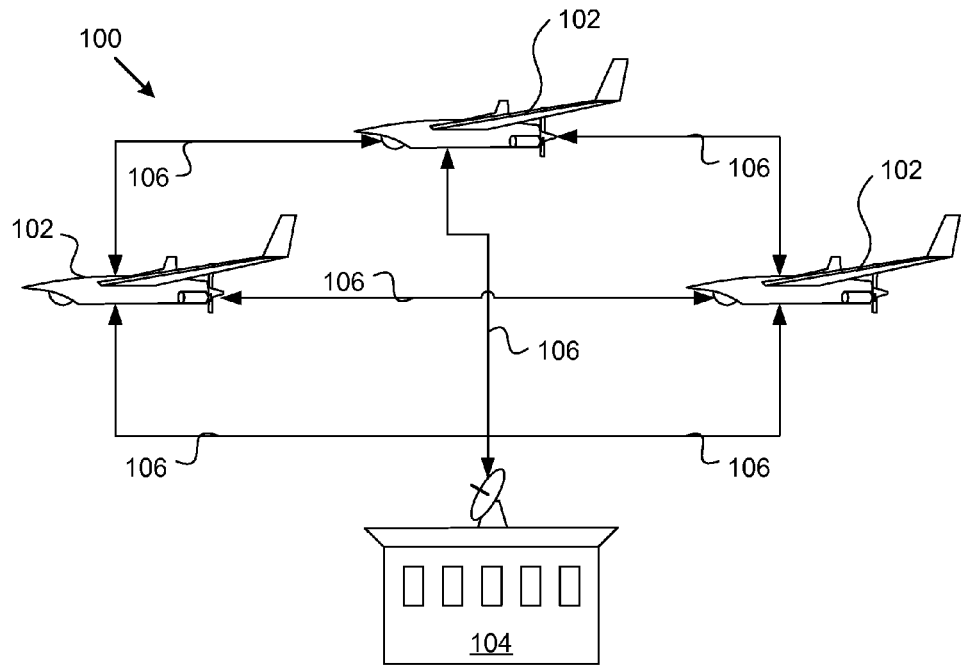
FIG. 1 is a block diagram showing one embodiment of a system for autonomously updating a mission element.

FIG. 1 is a block diagram showing one embodiment of system 100 for autonomously updating a mission element. The system 100 comprises a plurality of unmanned vehicles 102 and a central command station 104. The unmanned vehicles 102 may comprise one or more unmanned aerial vehicles (UAVs). In some embodiments, the unmanned vehicles 102 comprise a heterogeneous group of UAVs. For example, the unmanned vehicles 102 may include different UAVs having different capabilities, including different ranges, operating altitudes, operating velocities, sensor capabilities, payload capabilities, and the like. In some embodiments, the unmanned vehicles 102 may include one or more unmanned ground vehicles (UGVs) that operate on the ground. In certain embodiments, the unmanned vehicles 102 comprise a mix of UAVs and UGVs, wherein the UAVs operate in the vicinity of the UGVs. In some embodiments, the unmanned vehicles 102 may comprise fixed-wing aircraft, rotary-wing aircraft, watercraft, and/or ground vehicles. Although three unmanned vehicles 102 are shown, in other embodiments, the system 100 may comprise any number of unmanned vehicles 102.

In some embodiments, the unmanned vehicles 102 require a mission to operate. A mission comprises one or more mission elements and, once defined, may be followed autonomously by the unmanned vehicles 102. In certain embodiments, a mission is defined with respect to tasks to be accomplished and/or objectives to be achieved. Each of the unmanned vehicles 102 may then collaborate with other unmanned vehicles 102 to perform a mission, either autonomously or under guidance of the central command station 104. Generally, each unmanned vehicle 102 is configured to autonomously update one or more mission elements during performance of the group mission without communicating with the central command station 104. The unmanned vehicles 102 are discussed in greater detail below with reference to FIG. 2.

The central command station 104, in one embodiment, provides missions, data, and/or computing resources for the unmanned vehicles 102. In some embodiments, the central command station 104 provides facilities for the control of the unmanned vehicles 102. For example, the central command station 104 may provide a computer infrastructure, including a graphical user interface, to allow a human operator to interact with (e.g., provide manual input for) the unmanned vehicles 102. As another example, the central command station 104 may provide computing resources unavailable on an unmanned vehicle. The central command station 104 also provides communication means to allow bi-directional communication with the unmanned vehicles 102. In some embodiments, the central command station 104 includes mission-defining resources and provides mission information and related data to the plurality of unmanned vehicles 102.

In one embodiment, the central command station 104 provides a group mission to the plurality of unmanned vehicles 102. The group mission may include one or more mission elements. The mission elements may include tasks to be accomplished and/or objectives to be achieved. The mission elements may also include a sequence in which the tasks or objectives should be accomplished, one or more resources needed to accomplish the mission, and definitions of the tasks or objectives, including: a type of task or objective, a location of the task or objective, and one or more parameters for the task or objective. Tasks may include, for example, one or more of a transit to a location (e.g., search area, refueling location, etc.), monitor (e.g., surveillance of) a location, count objects (e.g., wildlife, buildings, etc.) within an area, track an object, loiter, activate a sensor, move a manipulator, search an area, and the like. Generally, a task is a function performed by one vehicle, whereas a mission element can include multiple vehicles, each performing a task or tasks.

In some embodiments, the group mission may include paths (e.g., a plurality of positions and a rate of travel) for the unmanned vehicles 102. For example, a group mission may include one or more flight plans, each with a list of one or more waypoints and timing requirements indicating where and when, respectively, an unmanned vehicle 102 should be to achieve the group mission. The flight plans may further include location and/or velocity constraints. In certain embodiments, the group mission may include a sensor plan and/or a communications plan indicating how sensor and/or communication equipment aboard the unmanned vehicles 102 should be deployed during the mission. In some embodiments, the group mission may include contingency plans, including contingency elements for each mission element.

In some embodiments, the central command station 104 provides one or more task commands to the unmanned vehicles 102, the one or more task commands configured to cause the unmanned vehicles to accomplish a mission task or objective. In some embodiments, the central command station 104 provides one or more waypoint goals (e.g., input waypoint goals each with one or more input waypoints) to the unmanned vehicles 102. In certain embodiments, the one or more waypoint goals include an individual waypoint for a single unmanned vehicle 102. In certain embodiments, the one or more waypoint goals include a group waypoint for multiple unmanned vehicles. The waypoint goals may be part of a path for an unmanned vehicle or may be a location where a mission element is to be accomplished (e.g., where a sensor scan is to be performed). In some embodiments, the waypoint goal is a rally location where two or more unmanned vehicles 102 are to meet.

In some embodiments, the central command station 104 receives vehicles positions from each of the unmanned vehicles 102. The vehicles positions, in one embodiment, may include absolute locations (e.g., coordinates from a global positioning system (GPS) or the like), relative locations (e.g., the relative location of one unmanned vehicle 102 with respect to another unmanned vehicle 102, with respect to a ground location or waypoint, and/or with respect to another vehicle, such as a manned vehicle, operating near the unmanned vehicle 102), and/or vehicle velocity and/or acceleration. In some embodiments, the central command station 104 receives health data from each of the unmanned vehicles 102, the health data including a health state for the unmanned vehicle 102. The health data may include operating conditions of the local vehicle, including a fuel status or battery charge state, and is discussed in further detail below with reference to FIG. 2. In some embodiments, the central command station 104 defines the group mission, or one or more mission elements, based on health states for the unmanned vehicles 102. For example, the central command station 104 may define a task to exclude an unmanned vehicle 102 in response to that vehicle being low on fuel.

The wireless communication links 106, in one embodiment, comprise communication links among the unmanned vehicles 102 and between the unmanned vehicles 102 and the central command station 104. The wireless communication links may comprise bi-directional communications using radio signals, infrared signals, ultrasonic signals, or any other suitable wireless signals. In some embodiments, signals are sent on one frequency and received on another. In some embodiments, communications between the unmanned vehicles 102 occur on different frequency bands than signals between the unmanned vehicles and the central command station 104. In some embodiments, the wireless communication links 106 include one or more relays, for example a communication satellite that relays communications from the central command station 104 to the unmanned vehicles 102 and vice versa.

Figure 2:
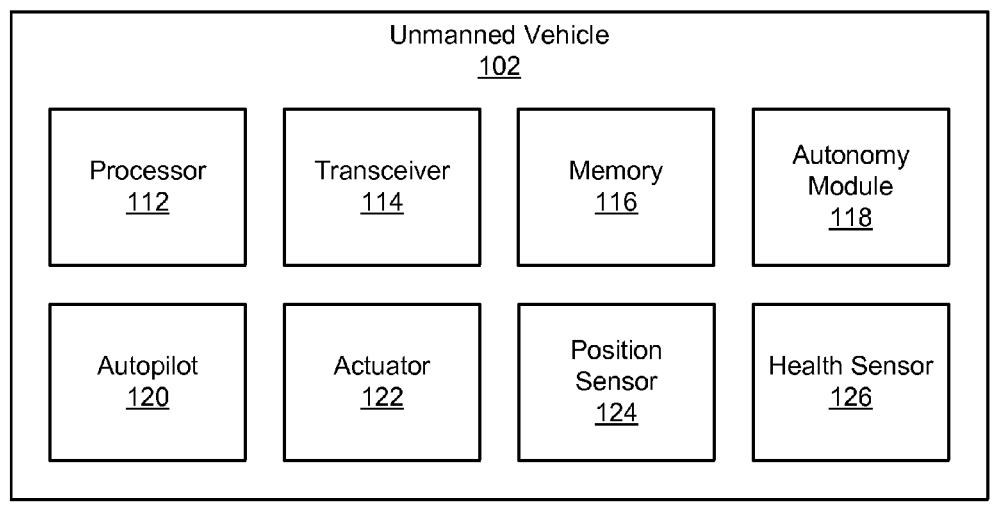
FIG. 2 is a schematic block diagram showing one embodiment of an unmanned vehicle for autonomously updating a mission element.

FIG. 2 is a schematic block diagram showing one embodiment of an unmanned vehicle 102 for autonomously updating a mission element. The unmanned vehicle 102 may be substantially similar to the unmanned vehicle 102 described above with reference to FIG. 1. The unmanned vehicle 102 includes a processor 112, a transceiver 114, a memory 116, an autonomy module 118, an autopilot 120, an actuator 122, a position sensor 124, and a health sensor 126.

The processor 112, in one embodiment, may comprise any known controller capable of executing computer-readable instructions and/or capable of performing logical operations. For example, the processor 112 may be a microcontroller, a microprocessor, a central processing unit (CPU), a graphics processing unit (GPU), an auxiliary processing unit, a field-programmable gate array (FPGA), or similar programmable controller. In some embodiments, the processor 112 executes instructions stored in the memory 116 to perform the methods and routines described herein. The processor 112 is communicatively coupled to the transceiver 114, the memory 116, the autonomy module 118, the autopilot 120, the actuator 122, the position sensor 124, and the health sensor 126.

The transceiver 114, in one embodiment, is configured to send and to receive electronic communications via the communication links 106. The transceiver 114 is a wireless transceiver capable of exchanging information via wireless data links. Examples of wireless data links include, but are not limited to, a satellite communication link (e.g., using a satellite radio band), a wireless cellular network, a local wireless network, such as a WI-FI™ or other wireless local area network, an ad hoc network, and the like. In some embodiments, the transceiver 114 communicates via an infrared signals and/or ultrasonic signals. All standards and/or connection types include the latest version and revision of the standard and/or connection type as of the filing date of this application.

The memory 116, in one embodiment, is a computer readable storage medium. In some embodiments, the memory 116 includes volatile computer storage media. For example, the memory 116 may include a random access memory (RAM), including dynamic RAM (DRAM), synchronous dynamic RAM (SDRAM), and/or static RAM (SRAM). In some embodiments, the memory 116 includes non-volatile computer storage media. For example, the memory 116 may include a hard disk drive, a flash memory, or any other suitable non-volatile computer storage device. In some embodiments, the memory 116 includes both volatile and non-volatile computer storage media.

In some embodiments, the memory 116 stores data relating to distributed collaborative operation processing. For example, the memory 116 may store a group mission (including mission elements, tasks, and/or objectives), vehicle positions, vehicle statuses, vehicle capabilities, and the like. In some embodiments, the memory 116 also stores program code and related data for autonomously updating a mission element on the unmanned vehicle 102.

The autonomy module 118, in one embodiment, is configured to receive a mission element of a group mission, modify the mission element based on availability of data, and generate one or more control commands for a local unmanned vehicle based on the modified mission element. As defined herein, the local unmanned vehicle is the unmanned vehicle 102 within which the autonomy module 118 is housed or to which the autonomy module 118 is coupled. In some embodiments, the autonomy module 118 modifies the mission element based on positions of other vehicles (e.g., other unmanned vehicles) and/or on a health state of the local unmanned vehicle. In some embodiments, the autonomy module 118 generates at least one task based on the modified mission element, the task configured to accomplish the modified mission element. The autonomy module 118 may comprise logical hardware (e.g., circuit or programmable hardware for executing logical instructions), software stored on a computer readable storage medium and executed on a processor, or a combination of both computer hardware and software. The hardware and/or software comprising the autonomy module 118 is replicated on each unmanned vehicle 102. Accordingly, in some implementations, the replicated autonomy modules 118 on each unmanned vehicle 102 provide redundant autonomy modules 118, where any one or more functional or operable autonomy modules 118 of one or more unmanned vehicles 102 may provide the functionality for a dysfunctional or inoperable autonomy module 118 on another unmanned vehicle 102.

The autonomy module 118 may further calculate a local waypoint goal based on the at least one task and calculates a path from a current position to the local waypoint goal. In further embodiments, the autonomy module 118 may calculate a path that minimizes vehicle crossings based on the waypoint goals received from other unmanned vehicles. In some embodiments, the autonomy module 118 defines a formation for the plurality of vehicles based on the modified mission element, wherein generating one or more control commands comprises calculating positional commands and velocity commands for the local vehicle (e.g., the unmanned vehicle 102) consistent with the defined formation.

The autopilot 120, in one embodiment, is configured to receive one or more waypoint goals and a local vehicle position and to generate actuator commands and throttle commands for achieving the waypoint goals. In some embodiments, the autopilot 120 receives positional commands and velocity commands for the unmanned vehicle 102 consistent with a defined formation. In some embodiments, the autopilot 120 receives a path from the autonomy module 118, the path comprising a plurality of positions (e.g., waypoints) and a rate of travel. The autopilot 120 then translates the path into a series of actuator commands and throttle commands for the unmanned vehicle 102 to follow the path. Generally, the autopilot 120 generates actuator commands and throttle commands based on received waypoints, positional commands, and/or velocity commands, wherein the actuator commands and throttle commands cause the unmanned vehicle 102 to move from a current position to a target position along a path computed by the autonomy module 118.

The actuator 122, in one embodiment, comprises a device for controlling motion of the unmanned vehicle 102. In some embodiments, the actuator 122 moves one or more flight control surfaces of an aircraft, including a rudder, an aileron, an elevator, a spoiler, a flap, a slat, a brake, or the like. In some embodiments, the actuator 122 moves one or more controls of a ground vehicle including a steering mechanism, a brake, and the like. In some embodiments, the actuator moves one or more controls of a watercraft, including a rudder or other steering mechanism. In certain embodiments, the actuator 122 comprises a device for controlling velocity of the unmanned vehicle 102, including a throttle control and/or a braking mechanism. The actuator controls the motion of the unmanned vehicle 102 responsive to actuator commands and/or throttle commands generated by the autopilot 120.

The position sensor 124, in one embodiment, is configured to measure position data for the unmanned vehicle 102. The position data measured by the position sensor 124 may include absolute locations of the unmanned vehicle 102 (e.g., coordinates from a global positioning system (GPS) or the like), relative locations of the unmanned vehicle 102 (e.g., the relative location of the local unmanned vehicle 102 with respect to others of the unmanned vehicles 102, with respect to a ground location or waypoint, and/or with respect to another vehicle, such as a manned vehicle, operating near the local unmanned vehicle 102), a velocity of the unmanned vehicle 102, an acceleration of the unmanned vehicle 102, a trajectory of the unmanned vehicle 102, and the like. In some embodiments, the unmanned vehicle 102 includes a plurality of position sensors 124, each position sensor 124 configured to measure a different aspect of the vehicle position data.

In some embodiments, the position sensor 124 includes a GPS receiver used to identify the three-dimensional coordinates (e.g., latitude, longitude, and altitude) of the unmanned vehicle 102. The GPS receiver uses satellite signals to calculate the position of the unmanned vehicle 102, for example via signal triangulation. In some embodiments, the position sensor 124 includes one or more inertial sensors used to identify the three-dimensional coordinates of the unmanned vehicle 102. In certain embodiments, the inertial sensors may supplement or provide refinement of positions generated by a GPS receiver. The one or more inertial sensors may include an inertial measurement unit (IMU), a gyroscope, and/or an accelerometer. In some embodiments, the position sensor includes an altimeter for measuring an altitude of the unmanned vehicle, a laser rangefinder for measuring a relative distance to an object (e.g., a building or another vehicle), and/or a camera system for determining location from one or more images.

The health sensor 126, in one embodiment, is configured to monitor, measure, or otherwise obtain health data relating to vehicle health of the unmanned vehicle 102. In some embodiments, health data includes temperatures, pressures, and other operating conditions of mechanical components (e.g., engines, transmissions, tires, wings, rudders, ailerons, engines, and the like) of the unmanned vehicle 102. In some embodiments, the health data includes temperatures, voltages, and other operating conditions of electrical systems (e.g., processors, controllers, motors, alternators, sensors, and the like) of the unmanned vehicle 102. In certain embodiments, the health data includes a fuel status, fluid level, battery charge, and the like for the unmanned vehicle 102. In some embodiments, the unmanned vehicle 102 includes a plurality of health sensors 126, each health sensor 126 configured to measure a different aspect of the vehicle health. The health sensor 126 enables monitoring the 'health' of the vehicle under operation, thus allowing detection of issues before these issues become critical. In some embodiments, the health sensor 126 stores the health data for tracking a health state of the unmanned vehicle 102 over time.

Figure 3:
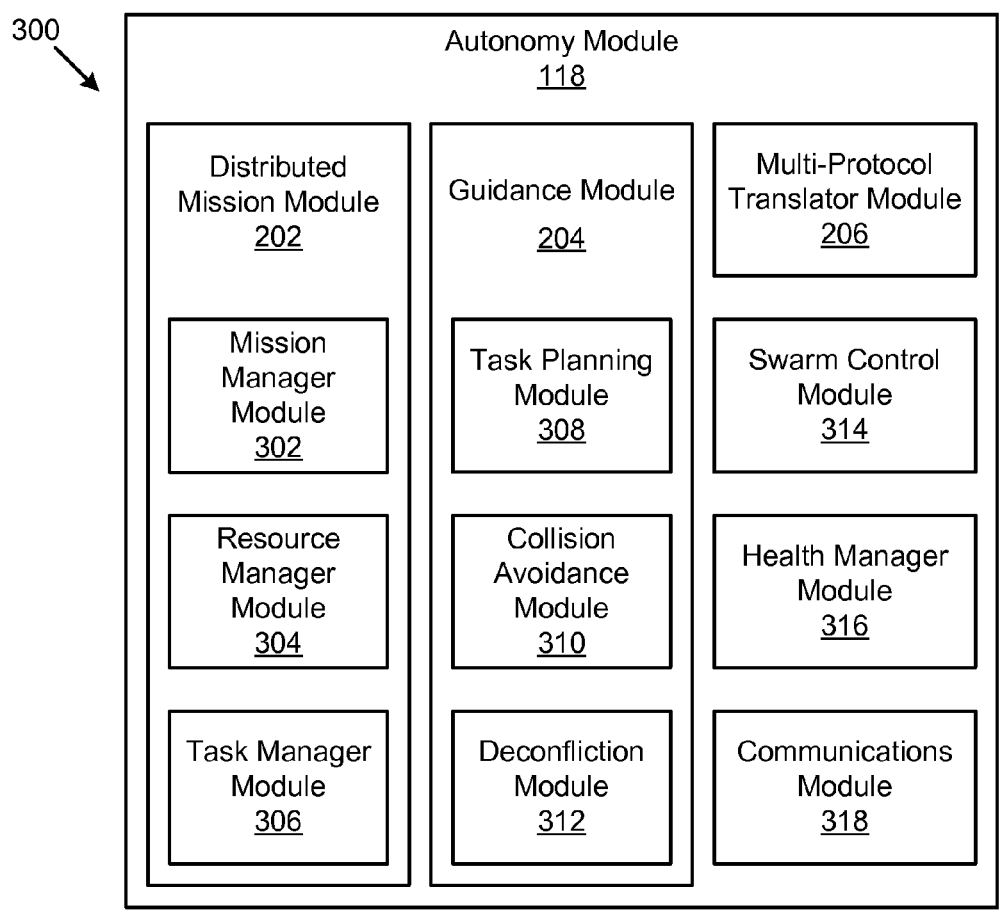
FIG. 3 is a schematic block diagram showing one embodiment of an apparatus for autonomously updating a mission element.

FIG. 3 is a schematic block diagram showing one embodiment of an apparatus 300 for autonomously updating a mission element. In some embodiments, the apparatus 300 is a part of an unmanned vehicle. In further embodiments, a group of unmanned vehicles may each include the apparatus 300. The apparatus 300 comprises common hardware and/or software found on each unmanned vehicle, so that, if fed the same the same data, each apparatus 300 generates the same solutions regardless of the host unmanned vehicles.

The apparatus 300 includes an autonomy module 118 which may be substantially similar to the autonomy module 118 described above with reference to FIG. 2. In general, the autonomy module 118 modifies a mission element of a group mission based on availability of data, computes a path for a local vehicle (e.g., an unmanned vehicle 102) based on the modified mission element, and converts the path into a local vehicle command (e.g., a flight command recognizable by the unmanned vehicle 102). The autonomy module 118, in one embodiment, includes a distributed mission module 202, a guidance module 204, and a multi-protocol translator module 206. In further embodiments, the autonomy module 118 may also include one or more of: a mission manager 302, a resource manager module 304, a task manager module 306, a task planning module 308, a collision avoidance module 310, a deconfliction module 312, a swarm control module 314, a health manager module 316, and a communications module 318.

In some embodiments, each module of the distributed mission module 202, the guidance module 204, the multi-protocol translator module 206, the mission manager 302, the resource manager module 304, the task manager module 306, the task planning module 308, the collision avoidance module 310, the deconfliction module 312, the swarm control module 314, the health manager module 316, and the communications module 318 comprise one or more of logic hardware and executable code, the executable code being stored on one or more computer readable storage media. Further, each of the modules of the autonomy module 118 may be communicatively coupled to one another.

The distributed mission module 202, in one embodiment, is configured to modify a mission element of a group mission based on availability of data, the group mission involving a plurality of vehicles. At the onset of a mission, a central controller, such as the central command station 104, transmits a group mission to each participating unmanned vehicle 102. The group mission includes one or more mission elements and is accessible by the distributed mission module 202. The distributed mission module 202 may then modify a mission element based on the availability of data, for example in response to certain data becoming unavailable. In some embodiments, the distributed mission module 202 may select a contingency element corresponding to the mission element in response to data from the central command station 104 being unavailable. In some embodiments, the distributed mission module 202 communicates the modified mission element to others of the group of unmanned vehicles 102. For example, one unmanned vehicle 102 may function as a surrogate for the central command station 104 in response to data from the central command station 104 becoming unavailable.

In some embodiments, the distributed mission module 202 may modify the mission element in response to loss of communications between the unmanned vehicles 102 and the central command station 104. For example, the distributed mission module 202 may modify a mission element to compensate for the loss of communications with the central command station 104 and resulting lack of data. However, in certain embodiments, an unmanned vehicle of the group may relay data from the central command station 104 to other unmanned vehicles. In this scenario, the distributed mission module 202 of a vehicle not in communication with the central command station 104 will not modify the mission element because the data is still available, even if no communication link exists between the vehicle and the central command station 104. Further, should communications be restored between the central command station 104 and the unmanned vehicles 102, the distributed mission module 202 may again modify the mission element to account for the newly available data.

In some embodiments, the distributed mission module 202 may modify a mission element in response to loss of communication with a particular unmanned vehicle 102 of the group of unmanned vehicles 102. For example, the particular unmanned vehicle 102 may become separated from the group and consequently lose communications with the rest of the group, resulting in the loss of data transferred between the particular unmanned vehicle 102 and the others of the group of unmanned vehicles 102. As another example, the particular unmanned vehicle may experience an equipment failure, such as a communication failure or a sensor failure, resulting in the loss of data transferred between the particular unmanned vehicle 102 and the others of the group of unmanned vehicles 102. Accordingly, the distributed mission module 202 may modify the mission element to compensate for the loss of the particular unmanned vehicle 102 and/or the loss of data acquired by the particular unmanned vehicle 102. As a corollary, should the particular unmanned vehicle 102 rejoin the group or recover from the equipment failure, the distributed mission module 202 may again modify the mission element to account for the newly available data.

In some embodiments, the distributed mission module 202 may modify a mission element in response to a loss of computing resources among the group of unmanned vehicles and/or the central command station 104. For example, if a mission element is computationally intensive and communications with the central command station 104 is lost, the group of unmanned vehicles 102 may not have the computational resources to accomplish the mission element. Accordingly, the distributed mission module 202 may modify the mission element based on the availability (e.g., the loss) of computational resources in response to the loss of communications. In certain embodiments, the distributed mission module 202 modifies the mission element based on other available resources and/or capabilities of the plurality of vehicles. The distributed mission module 202 may also modify a mission element based on vehicle health data in some embodiments.

The distributed mission module 202, in one embodiment, may define at least one task for the local unmanned vehicle 102 based on the modified mission element. In certain embodiments, each defined task includes a task type, a task location, and a task parameter. In some embodiments, the distributed mission module 202 provides at least one task to the guidance module 204, wherein the guidance module 204 computes a path based on the at least one task. In some embodiments, the distributed mission module 202 receives health data for the local vehicle and modifies a task based on the health data. As discussed above with reference to FIG. 2, the health data may include operating conditions of the local vehicle, including a fuel status or battery charge state. In certain embodiments, the distributed mission module 202 may communicate the at least one defined task to others of the group of unmanned vehicles 102.

In certain embodiments, the distributed mission module 202 may determine one or more waypoints based on the modified mission element. The one or more waypoints may include a local waypoint for the local unmanned vehicle and/or a group waypoint for the group of unmanned vehicles. The distributed mission module 202 may then communicate the one or more waypoints to others of the group of unmanned vehicles 102. For example, the distributed mission module 202 may communicate a group waypoint to the group of unmanned vehicles 102 to coordinate travel to the group waypoint. As another example, the distributed mission module 202 may communicate a local waypoint to the group of unmanned vehicles 102 to coordinate paths in order to avoid collisions, congestion, and/or to minimize path crossings among the group of unmanned vehicles 102.

In certain embodiments, the distributed mission module 202 may comprise one or more sub-modules including the mission manager module 302, the resource manager module 304, and the task manager module 306. Each sub-module may receive specific inputs and generate certain outputs, as discussed below in further detail. Although the distributed mission module 202 is depicted as a single unit including all the modules 302, 304, and 306, in some embodiments, the distributed mission module 202 can include several units in communication with each other, with each unit including one or more of the modules. Further, the units of a multi-unit controller need not be physically proximate to each other, and in fact can be remote from each other, but remain in communication with each other as necessary to perform the functionality of the modules. As defined herein, a unit is a separate, at least partially isolated, physical element.

The guidance module 204, in one embodiment, is configured to compute a path for a local vehicle of the plurality of vehicles based on the modified mission element, the path configured to achieve the modified mission element. In certain embodiments, the guidance module 204 receives one or more waypoints from the distributed mission module 202 and plans a path for the local vehicle that reaches the one or more waypoints. In further embodiments, the guidance module 204 plans a path that reaches each waypoint according to a specified order. In certain embodiments, the guidance module 204 receives one or more tasks from the distributed mission module 202 and plans a path for the local vehicle, the path configured to achieve the one or more tasks. Generally, the guidance module 204 and the multi-protocol translator module 206 cooperate to generate position, velocity, and/or waypoint commands used by the autopilot 120 to direct the unmanned vehicle 102 along the calculated path.

In some embodiments, the guidance module 204 determines one or more waypoints for accomplishing a task, for example a task modified by the distributed mission module 202, and plans a path for accomplishing the task that includes the waypoints. In some embodiments, the guidance module 204 may prioritize the waypoints in order to minimize fuel expenditure while accomplishing the mission elements. In certain embodiments, the guidance module 204 may generate one or more velocity commands for the local vehicle based on timing requirements between successive waypoints. For example, the guidance module 204 may identify times when the local vehicle needs to be at waypoint A and at waypoint B, and automatically determine a velocity needed to meet the timing requirements.

In some embodiments, the guidance module 204 may modify a path based on positions of other vehicles. For example, the guidance module 204 may modify the waypoints commands or task commands received by the distributed mission module 202 to avoid collisions with other vehicles. As another example, the guidance module 204 may modify, in real-time, a predetermined path in order to avoid a collision and dynamically plan a new path to a waypoint to account for the derivation from the predetermined path. In certain embodiments, the guidance module 204 may receive waypoints from other unmanned vehicles 102 and modify a local path to minimize path crossings among the vehicles. In some embodiments, the guidance module 204 may determine a formation for the plurality of unmanned vehicles 102 based on the modified mission element and compute a path for the local unmanned vehicle 102 consistent with the defined formation.

In some embodiments, the guidance module 204 is further configured to compute paths for each of the others of the plurality of vehicles based on the modified mission element. For example, the guidance module 204 may receive positions and waypoints for others of the group of unmanned vehicles 102 and may plan a path for the others based on their positions and waypoints. As another example, the guidance module 204 may receive a task applicable to a group of the unmanned vehicles 102 and may plan paths for accomplishing the task for the group based on their positions. Accordingly, a plurality of unmanned vehicles 102 may be slaved to a particular unmanned vehicle 102, the guidance module 204 of the particular unmanned vehicle 102 becoming a master controller for calculating paths for the plurality of unmanned vehicle 102.

In some embodiments, the guidance module 204 receives health data for the local vehicle and calculates a path based on the health data. As discussed above with reference to FIG. 2, the health data may include operating conditions of the local vehicle, including a fuel status or battery charge state. The guidance module 204 may modify a path, a task, and/or a waypoint based on the health data.

In certain embodiments, the guidance module 204 may comprise one or more sub-modules including the task planning module 308, the collision avoidance module 310, and the deconfliction module 312. Each sub-module may receive specific inputs and generate certain outputs, as discussed below in further detail. Although the guidance module 204 is depicted as a single unit including all the modules 308, 310, and 312, in some embodiments, the guidance module 204 can also include several units in communication with each other, with each unit including one or more of the modules. Further, the units of a multi-unit controller need not be physically proximate to each other, and in fact can be remote from each other, but remain in communication with each other as necessary to perform the functionality of the modules.

The multi-protocol translator module 206, in one embodiment, is configured to convert the path into a local vehicle control command. In certain embodiments, the multi-protocol translator module 206 generates a command (e.g., one or more of a roll command, rudder command, and sideslip command) for achieving the calculated path. Generally, the guidance module 204 and the multi-protocol translator module 206 cooperate to generate position, velocity, and waypoint commands used by the autopilot 120 to direct the unmanned vehicle 102 along the calculated path.

In some embodiments, the multi-protocol translator module 206 converts, to a common format, mission elements, waypoints, task commands, and vehicle positions received from the central command station 104 and/or from others of the unmanned vehicles 102. The common format may be a format usable by the distributed mission module 202 and/or the guidance module 204. Conversely, the multi-protocol translator module 206 may convert from the common format to one useable by the autopilot, the central command station 104, and/or others of the unmanned vehicles 102. Additionally, the multi-protocol translator module 206 may be configured to convert format and/or protocols for any data and/or instructions communicated between the modules 302-318 and the autopilot 120 or the central command station 104.

In certain embodiments, the multi-protocol translator module 206 formats health data received from a health sensor (e.g., the health sensor 126) into a format usable by the distributed mission module 202, the guidance module 204, the central command station 104, and/or others of the unmanned vehicles 102. Multi-protocol translator module 206 may automatically identify the protocol used by the central command station 104 and the autopilot 120, and automatically translate (e.g., convert) the data and commands to and from the identified protocol. Supported protocols may include, for example, STANAG4586, MAV-LINK, UCI, and the like.

The mission manager module 302, in one embodiment, is configured to receive a mission element of a group mission, the group mission involving a plurality of vehicles. In some embodiments, the mission manager module 302 receives the mission element from the central command station 104. In other embodiments, the mission manager module 302 may receive a mission element from another of the unmanned vehicles 102. For example, one of the other unmanned vehicles may communicate a modified mission element to the mission manager module 302 in response to the central command station 104 losing communications with the group of unmanned vehicles 102.

In some embodiments, the mission manager module 302 is configured to determine one or more resources needed to accomplish a particular mission element or task. For example, the mission manager module 302 may identify sensors needed to achieve a mission element. As another example, the mission manager module 302 may identify a resource requirement within the defined group mission. The mission manager module 302 may issue a resource request to the resource manager module 304, based on the determined resource.

In some embodiments, the mission manager module 302 is configured to identify one or more tasks needed to accomplish a mission element. For example, the mission manager module 302 may parse the mission definition to identify a task type, a task location, and task parameters related to a mission element. The mission manager module 302 may further track which tasks have been accomplished and issue a task request to the task manager module 306, based on pending tasks. In some embodiments, the mission manager module 302 may prioritize tasks in the group mission such that higher priority tasks are assigned, and resources dedicated for these tasks, ahead of lower priority tasks. While depicted as a sub-module of the distributed mission module 202, in some embodiments, the mission manager module 302 comprises a separate module or unit in communication with the distributed mission module 202.

The resource manager module 304, in one embodiment, is configured to identify resources and capabilities of the plurality of vehicles. In some embodiments, the resource manager module 304 identifies taskable resources, that is, resources among the unmanned vehicles 102 that are available for a particular task. The resource manager module 304 may track which resources are assigned to which mission elements or tasks and notify the mission manager module 302 and or the task manager module 306 of taskable resources. In some embodiments, the resource manager module 304 monitors resource usage during the group mission to ensure that a particular resource is not over-taxed during the mission. The resource manager module 304 may also modify a mission element based on available resources and capabilities of the plurality of vehicles. While depicted as a sub-module of the distributed mission module 202, in some embodiments, the resource manager module 304 comprises a separate module or unit in communication with the distributed mission module 202.

The task manager module 306, in one embodiment, is configured to define a task for the local vehicle based on the modified mission element. In certain embodiments, the task manager module 306 assigns a task to one or more of the plurality of unmanned vehicles 102 based on a task request from the mission manager module 302. In certain embodiments, the task manager module 306 assigns a task based on taskable resources indicated by the resource manager module 304. In certain embodiments, the task manager module 306 receives health data for the local vehicle and assigns and/or modifies a task based on the health data. In some embodiments, the task manager module 306 sends a waypoint or task command to the guidance module 204, wherein the guidance module 204 generates a waypoint goal and plans a path based on the defined task.

The task planning module 308, in one embodiment, is configured to generate a waypoint goal based on the modified mission element. Furthermore, the guidance module 204 is also configured to compute a path that reaches the waypoint goal. Generally, input waypoints of input waypoint goals received by the distributed mission module 202 from the command station 104 may include a location to start a mission and the location to end the mission, or search area corners for a search task. Additional input waypoints may define intermediate input waypoints between starting waypoints and ending waypoints, or area constraint waypoints. In contrast, the task planning module 308 generates output waypoint goals (e.g., each with one or more output waypoints) that help to achieve the input waypoint goals by taking into consideration vehicle dynamics (e.g., turn radius) or other constraints. Output waypoints are typically spaced closer together than input waypoints, and may define curved tracks based on turn radius, Bezier curves, speed, or other constraints or features of the vehicle 102. In some embodiments, the task planning module 308 receives health data for the local vehicle, wherein the waypoint goal is based on the health data. In some embodiments, the task planning module 308 receives positions of other vehicles, wherein the waypoint goal is based on the positions of the other vehicles.

The collision avoidance module 310, in one embodiment, is configured to receive vehicle positions for the plurality of vehicles and to modify the path in real-time based on the vehicles' positions to avoid collisions. The collision avoidance module 310 dynamically alters a pre-established path or trajectory of the local vehicle to avoid collisions with the other vehicles and/or stationary objects. In certain embodiments, the collision avoidance module 310 receives vehicle positions of the local vehicle and compares them to the vehicle positions of the other vehicles. In some embodiments, the collision avoidance module 310 monitors positional and/or velocity commands from the swarm control module 314 and modifies these commands to avoid collisions with nearby vehicles or objects.

The deconfliction module 312, in one embodiment, is configured to receive waypoint goals for the plurality of vehicles and to modify the path based on the waypoint goals to minimize path conflicts among the plurality of vehicles. Examples of path conflicts include path crossings, two or more vehicles attempting to follow the same path at the same time, paths for two or more vehicles that are too close to each other, and the like. In some embodiments, the deconfliction module 312 analyzes paths that achieve the waypoint goals and selects a path that minimizes path conflicts among the plurality of vehicles. In certain embodiments, the deconfliction module 312 communicates the modified path to the plurality of vehicles. Generally, the modules 308, 310, and 312 cooperate to generate a navigation solution (e.g., a path) for the local vehicle.

The swarm control module 314, in one embodiment, is configured to generate control commands (e.g., velocity and positional commands) and/or waypoints for the local vehicle to cooperate as a swarm with the plurality of vehicles 102. The plurality of unmanned vehicles 102, in some embodiments, are configured to operate as a swarm to coordinate performance of tasks or mission elements. In some embodiments, the swarm control module 314 selects a formation for the plurality of vehicles and computes guidance commands configured to cause the local vehicle to travel in the selected formation. In some embodiments, the swarm of vehicles is assigned a group task, the guidance commands selected to accomplish the group task. The swarm control module 314 may coordinate activities, including positions and velocities, among the swarm while accomplishing the group task. In certain embodiments, the swarm control module 314 receives a group waypoint, wherein the guidance commands are selected to bring the swarm (including the local vehicle) to the group waypoint.

In some embodiments, the swarm control module 314 gathers data regarding the local vehicle, for example via the position sensor 124 and/or the health sensor 126. For example, the swarm control module 314 may monitor data regarding the local vehicle's position, heading, velocity, and acceleration. The swarm control module 314 may further obtain data relating to relative distances between the local vehicle and others of the plurality of unmanned vehicles 102. The swarm control module 314 then computes in real-time guidance commands, for example using flight control algorithms stored in the memory 116. In certain embodiments, the guidance commands are then sent to the autopilot 120. In certain embodiments, the swarm control module 314 sends the waypoints to the guidance module 204 for planning a path based on the generated waypoints.

The health manager module 316, in one embodiment, is configured to determine a health state of the local vehicle. The health manager module 316 is connected to the health sensor 126 and received health data therefrom. As discussed above with reference to FIG. 2, the health data may include operating conditions of mechanical components (e.g., engines, transmissions, tires, wings, rudders, ailerons, engines, and the like) of the local vehicle, operating conditions of electrical systems (e.g., processors, controllers, motors, alternators, sensors, and the like) of the local vehicle, and a fuel status or battery charge state of the local vehicle. The health manager module 316 analyzes the received health data to determine the health state for the local vehicle. In some embodiments, the health manager module 316 uses one or more health algorithms stored in the memory 116 to process the health data.

In some embodiments, the health manager module 316 detects a vehicle health emergency based on the health data. The health manager module 316 may then generate a health alarm wherein the distributed mission module 202, guidance module 204, and/or autopilot 120 may alter the path of the local vehicle in response to the health alarm. In some embodiments, the health manager module 316 generates one or more emergency commands (e.g., such as an emergency landing command) in response to the health alarm.

The health manager module 316 may communicate the health state to the distributed mission module 202, wherein the distributed mission module 202 modifies a mission element based on the health state. The health manager module 316 may also communicate the health state to the guidance module 204, wherein the guidance module 204 modifies a path based on the health state. Further, the health manager module 316 may communicate the health state to the task manager module 306 and/or the task planning module 308, wherein the task manager module 306 and/or task planning module 308 modify a vehicle task based on the health state.

The communications module 318, in one embodiment, is configured to transmit and receive position data for the plurality of vehicles. The communications module 318 may be configured to use a particular communication protocol when transmitting and receiving position data. In some embodiments, the communications module 318 communicates modified mission elements, tasks, waypoints, and health data among the unmanned vehicles 102 and between the central command station 104 and the unmanned vehicles. In general, the communications module 318 facilitates communication among the unmanned vehicles 102 and between the central command station 104 and the unmanned vehicles via the transceiver 114. The communications module 318 includes a library with a plurality of wireless link drivers in some implementations. Each wireless link driver corresponds with a different wireless communication link, such as one of SATCOM™, 4G, WIMAX®, Link16, radio frequency (RF), ZigBee® mesh, for example. The library of wireless link drivers allows the communications module 318 to transmit and receive communications using a variety of commonly used wireless communication links.

Figure 4:
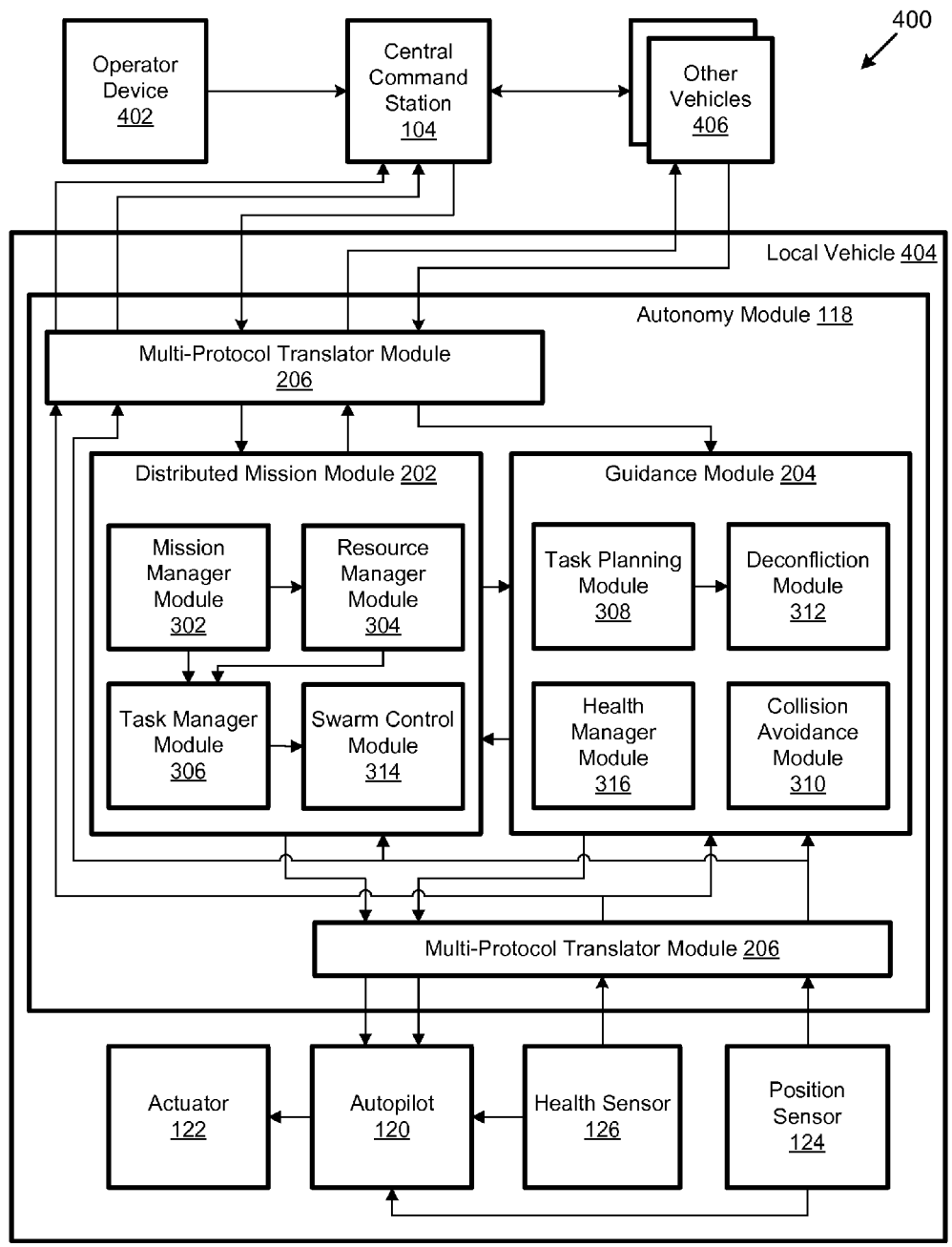
FIG. 4 is a block diagram showing one embodiment of a system for autonomously updating a mission element.

FIG. 4 is a schematic block diagram of one embodiment of a system 400 for autonomously updating a mission element. The system 400 includes a central command station 104, an operator device 402, a local vehicle 404, and a plurality of other vehicles 406.

The central command station 104, in one embodiment, provides mission information and data to the local vehicle 404 and the other vehicles 406. The central command station 104 may be substantially as described above with reference to FIG. 1. In certain embodiments, the mission information and data includes one or more of a mission definition, a mission element, a sequence for a plurality of mission elements, a resource request for a mission element, a task definition (e.g., a task type, a task location, and/or at least one task parameter) for a mission element. In certain embodiments, the mission information and data includes a waypoint or task command for the local vehicle 404.

In some embodiments, the central command station 104 receives manual input from the operator device 402 and provides waypoints and/or control commands to the local vehicle 404 and the other vehicles 406 based on the manual input. In certain embodiments, the mission information and data includes a group waypoint or a control command based on manual input.

The central command station 104 receives vehicle position data and health data from the local vehicle 404. In some embodiments, the position data includes an absolute or relative location of the local vehicle 404, a velocity of the local vehicle 404, an acceleration of the local vehicle 404, a trajectory of the local vehicle 404, and the like. In some embodiments, the health data includes operating conditions of the local vehicle 404, including a fuel status or battery charge state, as described above with reference to FIG. 2. In certain embodiments, the health data includes a condition and capability (e.g., a health state, an endurance state) of the local vehicle 404. In some embodiments, the central command station 104 receives vehicle position data and/or health data from each of the other vehicles 406.

The operator device 402, in one embodiment, is a control device configured to provide manual input to the central command station 104 from inputs received from an operator (e.g., a remote pilot, an unmanned vehicle operator, or the like). In some embodiments, the operator device 402 may include one or more of a user interface, a joystick, a keyboard, or other suitable controller. In certain embodiments, the operator device 402 is co-located with the central command station 104. For example, the central command station 104 may include an operator station containing the operator device 402. In other embodiments, the operator device 402 is located remotely from the central command station 104.

The local vehicle 404, in one embodiment, is one unmanned vehicle among a plurality of unmanned vehicles. In some embodiments, the local vehicle 404 is substantially similar to the unmanned vehicle 102 described above with reference to FIGS. 1 and 2. The local vehicle 404 is configured to operate in collaboration with the other vehicles 406 to accomplish a group mission, including one or more elements of the group mission. In some embodiments, the local vehicle 404 may autonomously modify one or more mission elements in response to loss of communications with the central command station 104.

The local vehicle 404 receives a mission information for a group mission from the central command station 104, the group mission comprising one or more mission elements actionable by the local vehicle 404 and the other vehicles 406. In certain embodiments, the mission information includes a mission definition, a mission element, a sequence for a plurality of mission elements, a resource request for a mission element, and/or a task definition (e.g., a task type, a task location, and/or at least one task parameter) for a mission element. In certain embodiments, the local vehicle 404 also receives a waypoint or task command for the local vehicle 404, the waypoint or task command configured to accomplish one or more mission elements of the group mission. The waypoint may be a local waypoint for the local vehicle 404 or a group waypoint for the local vehicle 404 and one or more of the other vehicles 406. In some embodiments, the local vehicle 404 receives vehicle position data for the other vehicles 406 from the central command station 104. In other embodiments, the local vehicle 404 receives the vehicle position data directly from the other vehicles 406.

As depicted, the local vehicle 404 may include an autonomy module 118 configured to receive a mission element of a group mission, modify the mission element based on availability of data, and generate one or more control commands for a local unmanned vehicle based on the modified mission element. The autonomy module 118 may be substantially as described above with reference to FIGS. 2 and 3. The autonomy module 118 includes a distributed mission module 202, a guidance module 204, and a multi-protocol translator module 206. The local vehicle 404 further includes an autopilot 120, an actuator 122, a position sensor 124, and a health sensor 126.

The distributed mission module 202, in one embodiment, includes a mission manager module 302, a resource manager module 304, a task manager module 306, and a swarm control module 314, and may be substantially as described above with reference to FIG. 3. Each of the mission manager module 302, resource manager module 304, task manager module 306, and swarm control module 314 may be substantially as described above with reference to FIG. 3. The distributed mission module 202 receives the mission information and data from the central command station 104, via the multi-protocol translator module 206. The distributed mission module 202 may receive vehicle position data for the local vehicle 404 and/or vehicle health data for the other vehicles 406. The distributed mission module 202 also receives (via the multi-protocol translator module 206) other vehicle positions from the central command station 104 and/or from the other vehicles 406. The distributed mission module 202, in some embodiments, processes the mission information and modifies a mission element, a task, and/or a resource request in response to loss of communications with the central command station 104, to unavailability of data within the system 400, and/or to unavailability of a computing resource among the system 400.

The mission manager module 302, in one embodiment, receives a mission definition and/or a mission element from the central command station 104. The mission manager module 302 may issue a resource request to the resource manager module 304 and/or a task request to the task manager module 306 based on a mission element, including a modified mission element. The resource manager module

304, in one embodiment, receives a resource request from the mission manager module 302 based on a mission element and identifies taskable resources among the local vehicle 404 and the other vehicles 406. In some embodiments, the resource manager module 304 provides the taskable resources to the task manager module 306 for assignment of one or more tasks related to the mission element based on the taskable resources. The task manager module 306, in one embodiment, receives a task request from the mission manager module 302 based on a mission element (e.g., a modified mission element), a list of taskable resources from the resource manager module 304, and/or health data for the local vehicle 404. The task manager module 306 then assigns one or more tasks to the local vehicle 404 based on the received input, the one or more tasks configured to achieve the mission element.

The swarm control module 314, in one embodiment, receives a local waypoint or task command from the task manager module 306 and calculates one or more vehicle control commands for the local vehicle 404 that cause the local vehicle 404 to operate as a swarm with one or more of the other vehicles 406 to achieve a task or mission element. In certain embodiments, the swarm control module 314 receives a group waypoint, wherein the vehicle control commands for the local vehicle 404 are configured to bring the local vehicle 404 to the group waypoint. In certain embodiments, the swarm control module 314 receives manual input from the operator device 402 via the central command station 104. The swarm control module 314 then calculates one or more vehicle control commands for the local vehicle 404 for swarm operation with the other vehicles 406 responsive to the manual input.

The guidance module 204, in one embodiment, includes a task planning module 308, a collision avoidance module 310, a deconfliction module 312, and a health manager module 316, and may be substantially as described above with reference to FIG. 3. Each of the task planning module 308, collision avoidance module 310, deconfliction module 312, and health manager module 316 may be substantially as described above with reference to FIG. 3. The guidance module 204 receives a waypoint or task command from the distributed mission module 202. The guidance module 204 then calculates a path (e.g., one or more output waypoints and timing requirements indicating where and when, respectively, the local vehicle 404 is to achieve the output waypoint) based on the received waypoint or task command. In some embodiments, the guidance module 204 may receive vehicle position data for the local vehicle 404 and/or vehicle health data for the other vehicles 406, wherein the one or more local vehicle control commands are based on the vehicle position data and/or the vehicle health data. The distributed mission module 202 also receives (via the multi-protocol translator module 206) other vehicle positions from the central command station 104 and/or from the other vehicles 406. In some embodiments, the guidance module 204 may modify vehicle control commands generated by the swarm control module 314 to avoid collisions (e.g., with other vehicles).

The task planning module 308, in one embodiment, receives a waypoint or task command from the distributed mission module 202, for example from the task manager module 306, and generates an output waypoint goal (e.g., with one or more output waypoints) that helps to achieve the input waypoint or task command by taking into consideration vehicle dynamics (e.g., turn radius) and/or other constraints. As discussed above with reference to FIG. 3, the output waypoint goals are typically spaced closer together than input waypoints, and may be generated based on constraints or features of the vehicle 102. The task planning module 308 may also receive, as inputs, health data from the health manager module 316, local vehicle position data from the position sensor 124, and/or vehicle position data for the other vehicles 406, wherein the output waypoint goal is based on the additional input data. The task planning module 308 sends one or more output waypoint goals to the deconfliction module 312.

The collision avoidance module 310, in one embodiment, is configured to receive vehicle positions for the other vehicles 406 and to modify vehicle control commands to avoid collisions. The deconfliction module 312, in one embodiment, is configured to receive output waypoint goals from the task planning module 308 and vehicle position for the other vehicles 406 and to modify the output waypoint goals to minimize path conflicts among the plurality of vehicles.

The health manager module 316, in one embodiment, is configured to determine a health state of the local vehicle. In some embodiments, the health manager module 316 processes health data received from the health sensor 126 to generate a condition and capability (e.g., a health state, an endurance state) of the local vehicle 404. The health manager module 316 communicates the health data, the health state, and/or the local vehicle conditions and capabilities to one or more of the central command station 104, the distributed mission module 202 (e.g., the task manager module 306), and the task planning module 308. While the health manager module 316 is depicted as part of the guidance module 204, in some embodiments, at least a portion of the health manager module 316 may be included in the autopilot 120.

The multi-protocol translator module 206, in one embodiment, is configured to translate inputs and data received from the central command station 104 into a format and/or protocol understood by the distributed mission module 202 and guidance module 204. The multi-protocol translator module 206 also translates inputs from the autopilot 120, position sensor 124, and/or health sensor 126 into a format and/or protocol understood by the distributed mission module 202 and guidance module 204. This allows the distributed mission module 202 and guidance module 204 to be platform independent. Accordingly, the distributed mission module 202 and guidance module 204 may be implemented by hardware common to the local vehicle 404 and each of the other vehicles 406.

The autopilot 120, in one embodiment, is configured to receive output waypoints from the guidance module 204 (e.g., from the deconfliction module 312) and vehicle control commands from the distributed mission module 202 (e.g., from the swarm control module 314). In some embodiments, the vehicle control commands include one or more velocity commands. The autopilot 120 also receives local vehicle position data from the position sensor 124 and local vehicle health data from the health sensor 126. The autopilot 120 outputs one or more actuator commands to the actuator 122 configured to achieve the output waypoints based on the vehicle control commands. In some embodiments, the autopilot 120 communicates the local vehicle position data and/or the local vehicle health data to the central command station 104. The autopilot 120 and actuator 122 may be substantially as described above with reference to FIG. 2.

The position sensor 124, in one embodiment, measures position data for the local vehicle 404 and outputs local vehicle position data to the distributed mission module 202, the guidance module 204, and the autopilot 120. In some embodiments, the position sensor 124 communicates the local vehicle position data to the central command station 104. The position sensor 124 may be substantially as described above with reference to FIG. 2. The health sensor 126, in one embodiment, measures health data for the local vehicle 404 and outputs local vehicle health data to the distributed mission module 202, the guidance module 204, and the autopilot 120. In some embodiments, the health sensor 126 communicates the local vehicle health data to the central command station 104. The health sensor 126 may be substantially as described above with reference to FIG. 2.

The other vehicles 406, in one embodiment, comprise a plurality of unmanned vehicles that operate in collaboration with the local vehicle 404. In some embodiments, each of the other vehicles 406 may be substantially similar to the unmanned vehicle 102 described above with reference to FIGS. 1 and 2. In a further embodiment, each of the other vehicles 406 may include an autonomy module 118 as described above with reference to FIGS. 2 and 3. The other vehicles 406 receive mission information and data from the central command station 104. The other vehicles 406 measure and communicate vehicle position data to the central command station 104 and the local vehicle 404. In some embodiments, the other vehicles 406 may receive modified mission elements and/or waypoints from the local vehicle 404.

Figure 5:
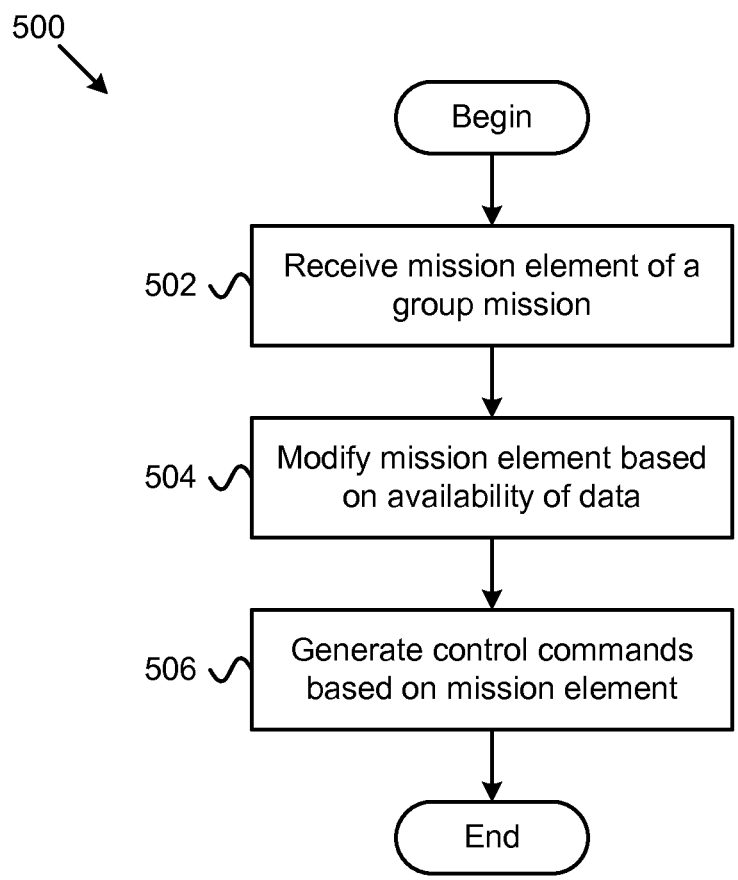
FIG. 5 is a schematic flowchart diagram of one embodiment of a method for autonomously updating a mission element.

FIG. 5 is a schematic flowchart diagram of one embodiment of a method 500 for autonomously updating a mission element. In some embodiments, the method 500 is performed using an autonomy processor, such as the autonomy module 118 described above with reference to FIGS. 2 and 3. In some embodiments, the method 500 is performed by a processor executing program code, for example, a microcontroller, a microprocessor, a central processing unit (CPU), a graphics processing unit (GPU), an auxiliary processing unit, a FPGA, or the like.

The method 500 begins and the autonomy processor receives 502 a mission element of a group mission. In certain embodiments, the group mission involves a plurality of vehicles, such as unmanned vehicles, including a local vehicle. In some embodiments, receiving 502 a mission element of a group mission includes receiving a group mission from a central control station, the group mission including a plurality of group elements. In some embodiments, receiving 502 a mission element includes receiving a mission element from another of the plurality of vehicles. For example, an unmanned vehicle may communicate a mission element to the local vehicle in response to the plurality of vehicles losing communications with the central control station.

The autonomy processor then modifies 504 a mission element based on availability of data, for example in response to certain data becoming unavailable. In some embodiments, modifying 504 the mission element includes selecting a contingency element corresponding to the mission element in response to data from the central control station being unavailable. In further embodiments, modifying 504 the mission element includes reverting to an original mission element in response to data from the central control station becoming available anew. In certain embodiments, modifying 504 the mission element includes modifying the mission element based on the vehicles positions for the plurality of vehicles and/or the health data for the plurality of vehicles.

In some embodiments, modifying 504 the mission element includes adapting the mission element in response to loss of communication with a particular unmanned vehicle of the plurality of unmanned vehicles. For example, the particular unmanned vehicle may become separated from the group and consequently lose communications with the rest of the group. Accordingly, the autonomy processor may modify 504 the mission element to compensate for the loss of data from the particular unmanned vehicle. As a corollary, should the particular unmanned vehicle rejoin the group and the data link restored, the autonomy processor may again modify 504 the mission element to account for the newly available data.

Next, the autonomy processor generates 506 one or more control commands for a local vehicle of the plurality of vehicles based on the modified mission element. In some embodiments, generating 506 the one or more control commands includes calculating a path from a current position to a local waypoint goal, wherein the local waypoint goal is for the local vehicle (e.g., an individual vehicle), and is based on the modified mission element. In further embodiments, generating 506 one or more control commands includes calculating a local vehicle path that minimizes path crossings among the plurality of vehicles. In some embodiments, generating 506 the one or more control commands includes calculating positional commands and velocity commands for the local vehicle consistent with a formation for the plurality of vehicles, wherein the formation is based on the modified mission element. The method 500 ends.

Figure 6:
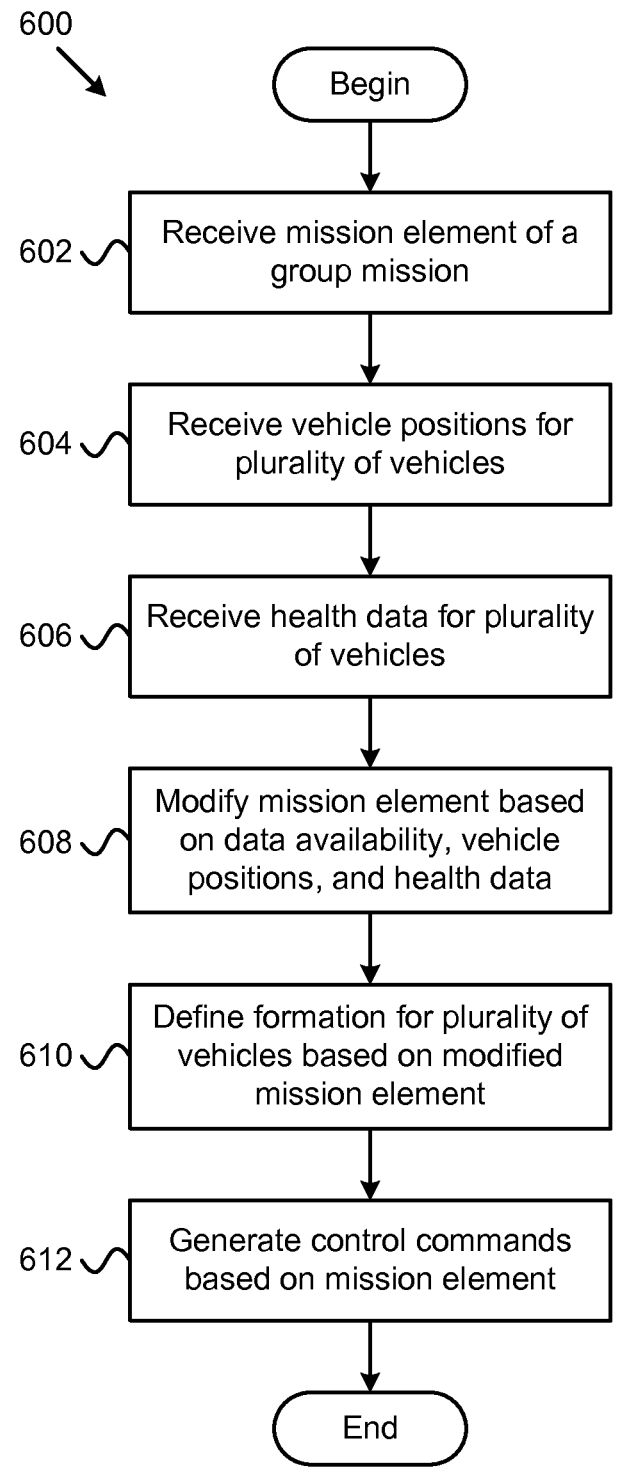
FIG. 6 is a schematic flowchart diagram of another embodiment of a method for autonomously updating a mission element.

FIG. 6 is a schematic flowchart diagram of one embodiment of a method 600 for autonomously updating a mission element. The method 600 is a more detailed embodiment of the method 500 discussed above with reference to FIG. 5. For example, while the method 600 contains all of the steps of the method 500, the method 600 also includes additional elements relating to additional data or processes used to modify a mission element and/or generate control commands.

In some embodiments, the method 600 is performed using an autonomy processor, such as the autonomy module 118 described above with reference to FIGS. 2 and 3. In some embodiments, the method 600 is performed by a processor executing program code, for example, a microcontroller, a microprocessor, a central processing unit (CPU), a graphics processing unit (GPU), an auxiliary processing unit, a FPGA, or the like.

The method 600 begins and the autonomy processor receives 602 a mission element of a group mission. In certain embodiments, the group mission involves a plurality of vehicles (such as unmanned vehicles) including a local vehicle. In some embodiments, receiving 602 a mission element of a group mission includes receiving a group mission from a central control station, the group mission including a plurality of group elements. In some embodiments, receiving 602 a mission element includes receiving a mission element from another of the plurality of vehicles. For example, an unmanned vehicle may communicate a mission element to the local vehicle in response to the plurality of vehicles losing communications with the central control station.

The autonomy processor then receives 604 vehicle positions for the plurality of vehicles. The vehicle positions may include absolute locations of each vehicle (e.g., coordinates from a global positioning system (GPS) or the like), relative locations of each vehicle (e.g., the relative location of one vehicle with respect to others of the plurality of vehicles, to a ground location, and/or to a waypoint), a velocity of each vehicle, an acceleration of each vehicle, and/or a trajectory of each vehicle. In some embodiments, receiving 604 vehicle positions includes receiving a local vehicle position from one or more local position sensors. In certain embodiments, receiving 604 vehicle positions for the plurality of vehicles includes receiving the vehicle positions from a central control station. In other embodiments, receiving 604 vehicle positions for the plurality of vehicles includes receiving the vehicle positions directly from the others of the plurality of vehicles.

Next, the autonomy processor receives 606 health data for the plurality of vehicles. As discussed above with reference to FIG. 2, the health data may include operating conditions of mechanical components (e.g., engines, transmissions, tires, wings, rudders, ailerons, engines, and the like) of the local vehicle, operating conditions of electrical systems (e.g., processors, controllers, motors, alternators, sensors, and the like) of the local vehicle, and a fuel status or battery charge state of the local vehicle. In some embodiments, receiving 606 health data includes receiving local health data from one or more local health sensors. In certain embodiments, receiving 606 health data for the plurality of vehicles includes receiving the health data from a central control station. In other embodiments, receiving 606 health data for the plurality of vehicles includes receiving the health data directly from the others of the plurality of vehicles.

The autonomy processor then modifies 608 a mission element based on availability of data, on the vehicle positions, and on the health data. In some embodiments, modifying 608 the mission element includes selecting a contingency element corresponding to the mission element in response to data from the central control station being unavailable. In some embodiments, modifying 608 the mission element includes adapting the mission element in response to loss of communication with a particular unmanned vehicle of the plurality of unmanned vehicles. In further embodiments, modifying 608 the mission element includes reverting to an original mission element in response to data becoming available anew.

In some embodiments, modifying 608 the mission element based on the health data includes adapting the mission element in response to a health alert among one or more of the plurality of vehicles. For example, if an unmanned vehicle experiences a mechanical breakdown, the autonomy processor may modify 608 the mission element to compensate for the unavailability of the unmanned vehicle. In some embodiments, modifying 608 the mission element based on the vehicle positions includes assigning waypoint or task commands based on locations of the plurality of vehicles. For example, if a contingency element is selected based on data unavailability, modifying 608 the mission element may include issuing a group waypoint command based on the contingency element and on the vehicle positions.

Next, the autonomy processor defines 610 a formation for the plurality of vehicles based on the modified mission element. In some embodiments, defining 610 the formation includes selecting a formation configured to achieve the modified mission element. In some embodiments, defining 610 the formation includes calculating a swarm formation, wherein the plurality of vehicles cooperate as a swarm to achieve the mission element.

The autonomy processor then generates 612 one or more control commands based on the modified mission element. In some embodiments, the control commands are for a local vehicle of the plurality of vehicles. In other embodiments, the control commands are for all of the plurality of vehicles. In some embodiments, generating 612 the one or more control commands includes calculating a path from a current position to a waypoint goal, wherein the local waypoint goal is based on the modified mission element. In certain embodiments, the waypoint goal includes a group waypoint for the plurality of vehicles. In further embodiments, generating 612 one or more control commands includes calculating one or more vehicle paths that minimize path crossings among the plurality of vehicles. In some embodiments, generating 612 the one or more control commands includes calculating positional commands and velocity commands consistent with the defined formation for the plurality of vehicles. The method 600 ends.

Figure 7:
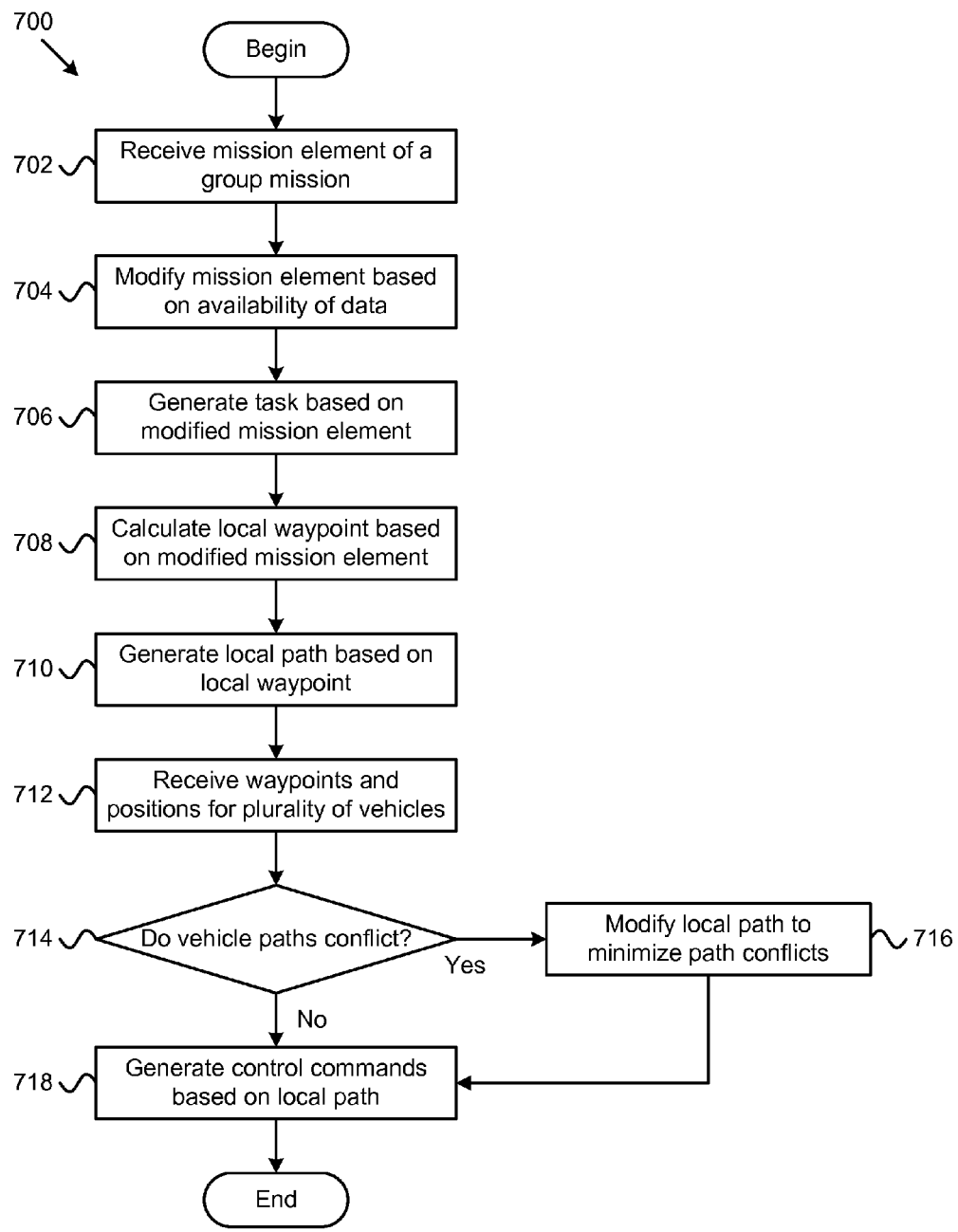
FIG. 7 is a schematic flowchart diagram of another embodiment of a method for autonomously updating a mission element.

FIG. 7 is a schematic flowchart diagram of one embodiment of a method 700 for autonomously updating a mission element. The method 700 is a more detailed embodiment of the method 500 discussed above with reference to FIG. 5. For example, while the method 700 contains all of the steps of the method 500, the method 700 also includes additional elements relating to additional data or processes used to modify a mission element and/or generate control commands. Further, while the method 700 is depicted as a separate embodiment, in some embodiments the methods 600 and 700 may be combined.

In some embodiments, the method 700 is performed using an autonomy processor, such as the autonomy module 118 described above with reference to FIGS. 2 and 3. In some embodiments, the method 700 is performed by a processor executing program code, for example, a microcontroller, a microprocessor, a central processing unit (CPU), a graphics processing unit (GPU), an auxiliary processing unit, a FPGA, or the like.

The method 700 begins and the autonomy processor receives 702 a mission element of a group mission. In certain embodiments, the group mission involves a plurality of vehicles (such as unmanned vehicles) including a local vehicle. In some embodiments, receiving 702 a mission element of a group mission includes receiving a group mission from a central control station, the group mission including a plurality of group elements. In some embodiments, receiving 702 a mission element includes receiving a mission element from another of the plurality of vehicles. For example, an unmanned vehicle may communicate a mission element to the local vehicle in response to the plurality of vehicles losing communications with the central control station.

The autonomy processor then modifies 704 a mission element based on availability of data, for example in response to certain data becoming unavailable. In some embodiments, modifying 704 the mission element includes selecting a contingency element corresponding to the mission element in response to data from the central control station being unavailable. In further embodiments, modifying 704 the mission element includes reverting to an original mission element in response to data from the central control station becoming available anew. In certain embodiments, modifying 704 the mission element includes modifying the mission element based on the vehicles positions for the plurality of vehicles and/or the health data for the plurality of vehicles.

In some embodiments, modifying 704 the mission element includes adapting the mission element in response to loss of communication with a particular unmanned vehicle of the plurality of unmanned vehicles. For example, the particular unmanned vehicle may become separated from the group and consequently lose communications with the rest of the group. Accordingly, the autonomy processor may modify 704 the mission element to compensate for the loss of data from the particular unmanned vehicle. As a corollary, should the particular unmanned vehicle rejoin the group and the data link restored, the autonomy processor may again modify 704 the mission element to account for the newly available data.

Next, the autonomy processor generates 706 one or more tasks based on the modified mission element. In some embodiments, generating 706 the one or more tasks includes reassigning tasks to one or more of the plurality of vehicles based on the modified mission element. In some embodiments, generating 706 the one or more tasks includes identifying differences between the original mission element and the modified mission element, including changed location and/or parameters, and modifying one or more original tasks based on the identified differences.

The autonomy processor then calculates 708 one or more local waypoints based on the modified mission element. In certain embodiments, the local waypoints are calculated to achieve one or more tasks assigned to the local vehicle. In some embodiments, calculating 708 the one or more local waypoints includes identifying a modified location corresponding to the modified mission element and determining one or more waypoints leading to the modified location. In some embodiments, calculating 708 the one or more local waypoints includes identifying a modified constraint corresponding to the modified mission element and determining one or more waypoints leading to a mission location that comply with the modified constraint. In some embodiments, calculating 708 the one or more local waypoints includes determining an order in which the waypoints should be visited.

Next, the autonomy processor generates 710 a local path based on the one or more local waypoints. The local path may further be based on one or more timing requirements associated with the local waypoints. In some embodiments, generating 710 the local path includes identifying a current location of the local vehicle and determining a path from the current location to the one or more local waypoints. In some embodiments, generating 710 the local path includes determining a path that reaches each local waypoint in a specified order. In some embodiments, generating 710 the local path includes identifying one or more tasks corresponding to the local waypoints and planning a path configured to achieve the one or more tasks.

The autonomy processor then receives 712 a plurality of waypoints and positions for the plurality of vehicles. Each position corresponds to one or the plurality of vehicles, while one or more of the received waypoints may correspond to each of the plurality of vehicles. The vehicle positions may include absolute locations of each vehicle (e.g., coordinates from a global positioning system (GPS) or the like), relative locations of each vehicle (e.g., the relative location of one vehicle with respect to others of the plurality of vehicles, to a ground location, and/or to a waypoint), a velocity of each vehicle, an acceleration of each vehicle, and/or a trajectory of each vehicle. In some embodiments, receiving 712 the waypoints and positions includes receiving the waypoints and positions from a central control station. In other embodiments, receiving 712 waypoints and positions for the plurality of vehicles includes receiving the waypoints and positions directly from the others of the plurality of vehicles.

Next, the autonomy processor determines 714 whether vehicle paths conflict among the plurality of vehicles. In some embodiments, a vehicle path conflict includes path crossings between two or more vehicles, two or more vehicles attempting to follow the same path at the same time, and/or paths for two or more vehicles that are too close to each other. In some embodiments, determining 714 whether vehicle paths conflict among the plurality of vehicles includes calculating paths for the plurality of vehicles that achieve the respective waypoints and identifying potential vehicle path conflicts If a vehicle path conflict exists, then the autonomy processor proceeds to modify 716 the local path to minimize path conflicts. Otherwise, if no vehicle path conflicts exist, then the autonomy processor proceeds to generate 718 one or more control commands based on the local path.

Modifying 716 the local path to minimize path conflicts, in one embodiment, includes selecting a path for the local vehicle that minimizes path conflicts among the plurality of vehicles. In further embodiments, modifying 716 the local path includes assigning a priority to different types of path conflicts and selecting a path that minimizes a path conflict type having a highest priority. In some embodiments, modifying 716 the local path, the autonomy includes modifying the local path, in real-time, based on the vehicles positions to avoid collisions. In response to modifying 716 the local path processor proceeds to generate 718 one or more control commands based on the (modified) local path.

Generating 718 one or more control commands based on the local path, in one embodiment, includes generating positional commands and/or velocity commands for the local vehicle that cause the local vehicle to follow the local path. In a further embodiment, generating the one or more control commands may include generating actuator commands and throttle commands for following the local path. In some embodiments, generating 718 the one or more control commands includes identifying timing requirements of the path and an acceleration profile for the local vehicle, wherein the velocity command based on the path timing requirements and the vehicle acceleration profile. In some embodiments, generating 718 the one or more control commands includes calculating positional commands and velocity commands consistent with a defined formation for the plurality of vehicles. The method 700 ends.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two."

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Many of the functional units described in this specification have been labeled as modules, in order to more particularly emphasize their implementation independence. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays (FPGAs), programmable array logic, programmable logic devices, or the like.

Modules may also be implemented in software for execution by various types of processors. An identified module of computer readable program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of computer readable program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the computer readable program code may be stored and/or propagated on in one or more computer readable medium(s).

The computer readable medium may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. Computer readable program code embodied on a computer readable signal medium may be transmitted using any appropriate medium, including but not limited to wireless, wireline, optical fiber cable, Radio Frequency (RF), or the like, or any suitable combination of the foregoing.

In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Computer readable program code for carrying out operations for aspects of the present invention may be written in any combination of one or more programming languages, including an object oriented programming language such as Java, Smalltalk, C++ or the like and conventional procedural programming languages, such as the "C" programming language or similar programming languages (e.g., LabVIEW). The computer readable program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method.

Additionally, the order in which a particular method occurs may or may not strictly adhere to the order of the corresponding steps shown.

The present subject matter may be embodied in other specific forms without departing from its spirit or essential characteristics. The described embodiments are to be considered in all respects only as illustrative and not restrictive. All changes which come within the meaning and range of equivalency of the claims are to be embraced within their scope.

What is claimed is:

1. An apparatus for semi-autonomous vehicle control, the apparatus comprising:
- a communications module configured to maintain a communication link with a central control station;
- a distributed mission module configured to:
  - receive mission data from the central control station, the mission data including a group mission involving a plurality of vehicles,
  - modify a mission element of the group mission in response to each of the plurality of vehicles losing communication with the central control station, and
  - determine one or more local waypoints based on the modified mission element;
- a guidance module configured to:
  - identify one or more tasks corresponding to the one or more local waypoints, and
  - compute a local path for a local vehicle of the plurality of vehicles based on the modified mission element, the local path configured to reach the one or more local waypoints and to achieve the modified mission element; and
- a multi-protocol translator module configured to convert the local path into one or more control commands for the local vehicle, wherein the local vehicle operates in response to the one or more control commands;
- wherein the distributed mission module, guidance module, and multi-protocol translator module are located on-board the local vehicle.

2. The apparatus of claim 1, wherein the distributed mission module selects a contingency element corresponding to the mission element in response to data from the central control station being unavailable.

3. The apparatus of claim 1, wherein the distributed mission module defines at least one task for the local vehicle based on the modified mission element, the task comprising a task type, a task location, and a task parameter, wherein the guidance module computes the local path based on the at least one task.

4. The apparatus of claim 1, wherein the guidance module is further configured to compute paths for each of others of the plurality of vehicles based on the modified mission element.

5. The apparatus of claim 1, further comprising a health manager module configured to determine a health state of the local vehicle, wherein the distributed mission module modifies the mission element based on the health state.

6. The apparatus of claim 1, further comprising a swarm control module configured to compute one or more control commands for the local vehicle to cooperate as a swarm with the plurality of vehicles.

7. The apparatus of claim 1, further comprising a deconfliction module configured to receive waypoint goals for the plurality of vehicles and to modify the local path based on the waypoint goals to minimize path conflicts among the plurality of vehicles.

8. The apparatus of claim 1, further comprising a collision avoidance module configured to receive vehicle positions for the plurality of vehicles and to modify the local path in real-time based on the vehicles positions to avoid collisions.

9. The apparatus of claim 1, further comprising a task manager module configured to define a task for the local vehicle based on the modified mission element, wherein the guidance module is further configured to generate a waypoint goal based on the defined task.

10. The apparatus of claim 9, further comprising a health manager module configured to determine a health state of the local vehicle, wherein the health state comprises a fuel status of the local vehicle and the task manager module modifies the task for the local vehicle based on the health state.

11. The apparatus of claim 1, further comprising a task planning module configured to generate a waypoint goal based on the modified mission element, wherein the guidance module is further configured to compute the local path that reaches the waypoint goal.

12. The apparatus of claim 1, further comprising a resource manager module configured to identify resources and capabilities of the plurality of vehicles, wherein the distributed mission module modifies the mission element based on available resources and capabilities of the plurality of vehicles.

13. The apparatus of claim 1, wherein the multi-protocol translator module automatically identifies a protocol of the local path, and automatically converts the local path into a different protocol corresponding with the one or more control commands for the local vehicle.

14. A method for semi-autonomous vehicle control, comprising:
- maintaining a communication link with a central control station;
- receiving mission data from the central control station, the mission data including a group mission involving a plurality of vehicles;
- modifying a mission element of the group mission in response to each of the plurality of vehicles losing communication with the central control station;
- determining one or more local waypoints based on the modified mission element;
- identifying one or more tasks corresponding to the one or more local waypoints;
- compute a local path for a local vehicle of the plurality of vehicles based on the modified mission element, the local path configured to reach the one or more local waypoints and to achieve the modified mission element; and
- converting the local path into one or more control commands for the local vehicle, wherein the local vehicle operates in response to the one or more control commands.

15. The method of claim 14, further comprising:
- receiving vehicle positions for the plurality of vehicles;
- receiving health data for the plurality of vehicles; and
- modifying the mission element based on the vehicles positions and the health data.

16. The method of claim 14, further comprising:
- generating at least one task based on the modified mission element, the task being configured to accomplish the modified mission element;
- calculating a local waypoint goal based on the at least one task, wherein generating the one or more control commands comprises calculating the local path from a current position to the local waypoint goal; and communicating the local waypoint goal to others of the plurality of vehicles.

17. The method of claim 16, further comprising:
receiving waypoint goals from the others of the plurality of vehicles;
calculating the local path that minimizes path conflicts based on the received waypoint goals; and
modifying the one or more control commands based on a calculated path.

18. The method of claim 14, further comprising defining a formation for the plurality of vehicles based on the modified mission element, wherein generating the one or more control commands comprises calculating positional commands and velocity commands for the local vehicle consistent with the defined formation.

19. A system for semi-autonomous vehicle control, comprising:
a central command station that provides mission data to a plurality of vehicles, the mission data including a group mission involving the plurality of vehicles, the group mission comprising a plurality of mission elements; and
a plurality of vehicles, each vehicle comprising an autonomy module, the autonomy module comprising:
a communications module configured to maintain a communication link with a central control station;
a distributed mission module configured to:
receive the group mission from the central control station,
modify a mission element of the group mission in response to each of the plurality of vehicles losing communication with the central control station, and
determine one or more local waypoints based on the modified mission element;
a guidance module configured to:
identify one or more tasks corresponding to the one or more local waypoints, and
compute a local path for a local vehicle of the plurality of vehicles based on the modified mission element, the local path configured to reach the one or more local waypoints and to achieve the modified mission element; and
a multi-protocol translator module configured to convert the local path into one or more control commands for the local vehicle, wherein the local vehicle operates in response to the one or more control commands;
wherein the communications module is further configured to transmit and receive positions for the plurality of vehicles, wherein the path is computed based on the positions for the plurality of vehicles.

20. The system of claim 19, wherein the distributed mission module selects a contingency element corresponding to one of the plurality of mission elements in response to data from the central command station being unavailable.

21. The system of claim 19, wherein the plurality of vehicles comprises one or more vehicles of the group consisting of: fixed-wing aircraft, rotary-wing aircraft, watercraft, and ground vehicles.

22. The system of claim 19, wherein the autonomy modules of the plurality of vehicles are redundant.

23. The system of claim 19, wherein the communications module comprises a plurality of wireless link drivers each corresponding with a different wireless communication link.

* * * * *